United States Patent
Zhu et al.

(10) Patent No.: US 8,910,035 B2
(45) Date of Patent: Dec. 9, 2014

(54) DISPLAY DIALOGS

(75) Inventors: Wei Zhu, Cupertino, CA (US); Nikolay A. Valtchanov, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 274 days.

(21) Appl. No.: 13/323,498

(22) Filed: Dec. 12, 2011

(65) Prior Publication Data

US 2013/0151943 A1    Jun. 13, 2013

(51) Int. Cl.
*G06F 17/21* (2006.01)

(52) U.S. Cl.
USPC .......................................... 715/234

(58) Field of Classification Search
USPC .......................................... 715/234
See application file for complete search history.

(56) References Cited

U.S. PATENT DOCUMENTS

| | | | |
|---|---|---|---|
| 7,409,710 B1 | 8/2008 | Uchil et al. | |
| 8,407,665 B1* | 3/2013 | Eddings et al. | 717/106 |
| 2002/0029243 A1* | 3/2002 | Melet et al. | 709/203 |
| 2002/0109730 A1* | 8/2002 | Dardick | 345/809 |
| 2003/0167234 A1* | 9/2003 | Bodmer et al. | 705/51 |
| 2004/0243471 A1* | 12/2004 | Salmen et al. | 705/15 |
| 2005/0187895 A1* | 8/2005 | Paya et al. | 707/1 |
| 2005/0257167 A1* | 11/2005 | Fraleigh et al. | 715/809 |
| 2006/0095860 A1* | 5/2006 | Wada et al. | 715/771 |
| 2006/0193008 A1 | 8/2006 | Osaka et al. | |
| 2006/0236253 A1* | 10/2006 | Gusmorino et al. | 715/762 |
| 2006/0248480 A1* | 11/2006 | Faraday et al. | 715/866 |
| 2006/0253799 A1* | 11/2006 | Montroy et al. | 715/809 |
| 2007/0050710 A1* | 3/2007 | Redekop | 715/523 |
| 2007/0288488 A1* | 12/2007 | Rohrs et al. | 707/100 |
| 2008/0133722 A1* | 6/2008 | Ramasundaram et al. | 709/222 |
| 2009/0183117 A1 | 7/2009 | Chang | |
| 2011/0179346 A1* | 7/2011 | Dufour et al. | 715/234 |
| 2011/0258562 A1* | 10/2011 | Zhu et al. | 715/760 |
| 2011/0283215 A1* | 11/2011 | Dunn et al. | 715/771 |
| 2012/0150941 A1* | 6/2012 | Goldman et al. | 709/203 |
| 2013/0080259 A1* | 3/2013 | Durvasula et al. | 705/14.66 |

FOREIGN PATENT DOCUMENTS

| | | |
|---|---|---|
| KR | 10-2006-0105221 A | 10/2006 |
| KR | 10-2007-0122039 A | 12/2007 |

OTHER PUBLICATIONS

Paskalev, Plamen, and Vladimir Nikolov. "Multi-platform, script-based user interface." In Proceedings of the 5th international conference on Computer systems and technologies, pp. 1-6. ACM, 2004.*
International Search Report and Written Opinion for International Application PCT/US2012/068345, Mar. 29, 2013.

* cited by examiner

*Primary Examiner* — Frank D Mills
(74) *Attorney, Agent, or Firm* — Baker Botts L.L.P.

(57) ABSTRACT

In one embodiment, a first device sends a request to a second device, the request causing a dialog to be displayed on the first device. The second device selects a rendered dialog template corresponding to the dialog; constructs a web page that includes the rendered dialog template; and sends the web page to the first device. The first device displays the web page including the dialog.

20 Claims, 3 Drawing Sheets

DISPLAY DIALOGS

TECHNICAL FIELD

This disclosure generally relates to displaying dialogs on electronic devices, such as mobile devices.

BACKGROUND

With computer software, dialogs are a type of user-interface (UI) component often used for communicating with users of the software. For example, a dialog may be used to ask a user a question and seek an answer to the question from the user (e.g., "Do you wish to add John Smith as your friend?"—"Yes" or "No"), or notify a user some information (e.g., "You have received a new email message."). Typically, a dialog is presented to the user in a pop-up window. The pop-up window goes away after the user has responded to or interacted with the dialog.

DESCRIPTION OF EXAMPLE EMBODIMENTS

With computer software, dialogs are a type of user-interface (UI) component often used for communicating with users of the software. In particular embodiments, a number of user-interface (UI) dialog templates are defined. Each dialog template corresponds to a specific type of UI dialog. Some of these dialog templates may each support dynamic content, which may change depending on when, where, or under what circumstances the corresponding dialogs are displayed. Each dialog template is rendered. In particular embodiments, the rendered dialog templates are stored, and each rendered dialog template is associated with a unique Uniform Resource Location (URL) for identifying and referencing that rendered dialog template. In particular embodiments, for each dialog template that supports some dynamic content, its corresponding rendered dialog template includes a number of place holders corresponding to the dynamic content.

In particular embodiments, when a specific dialog needs to be displayed on an electronic device (e.g., a mobile device), a rendered dialog template corresponding to the specific dialog to be displayed is selected. A web page is constructed to include the rendered dialog template and sent to the electronic device for display. In particular embodiments, if the rendered dialog template includes any place holder for dynamic content, the appropriate dynamic content is also sent to the electronic device. When the web page, and thus the dialog, is displayed, the place holders in the rendered dialog template are replaced with their corresponding dynamic content so that the appropriate dynamic content is actually displayed, in place of the place holders.

While dialogs are a useful UI tool for communicating with software users, in some cases, implementing or rendering dialogs for display on electronic devices may take a relatively long time and thus cause inconvenient or annoying delays. For example, sometimes, an electronic device (e.g., a mobile telephone) may have a limited amount of resources (e.g., in terms of processing power or memory) and thus may take a relatively long time to render and display dialogs. Sometimes, a third party may wish to incorporate its own dialogs into software implemented or hosted by another party (e.g., the first party) and have these dialogs displayed to the users of the first party's software under certain circumstances. Traditionally, dialogs are often presented in pop-up windows, and implementing, rendering, and displaying these pop-up windows require additional process and thus takes even longer time.

Figure 1:
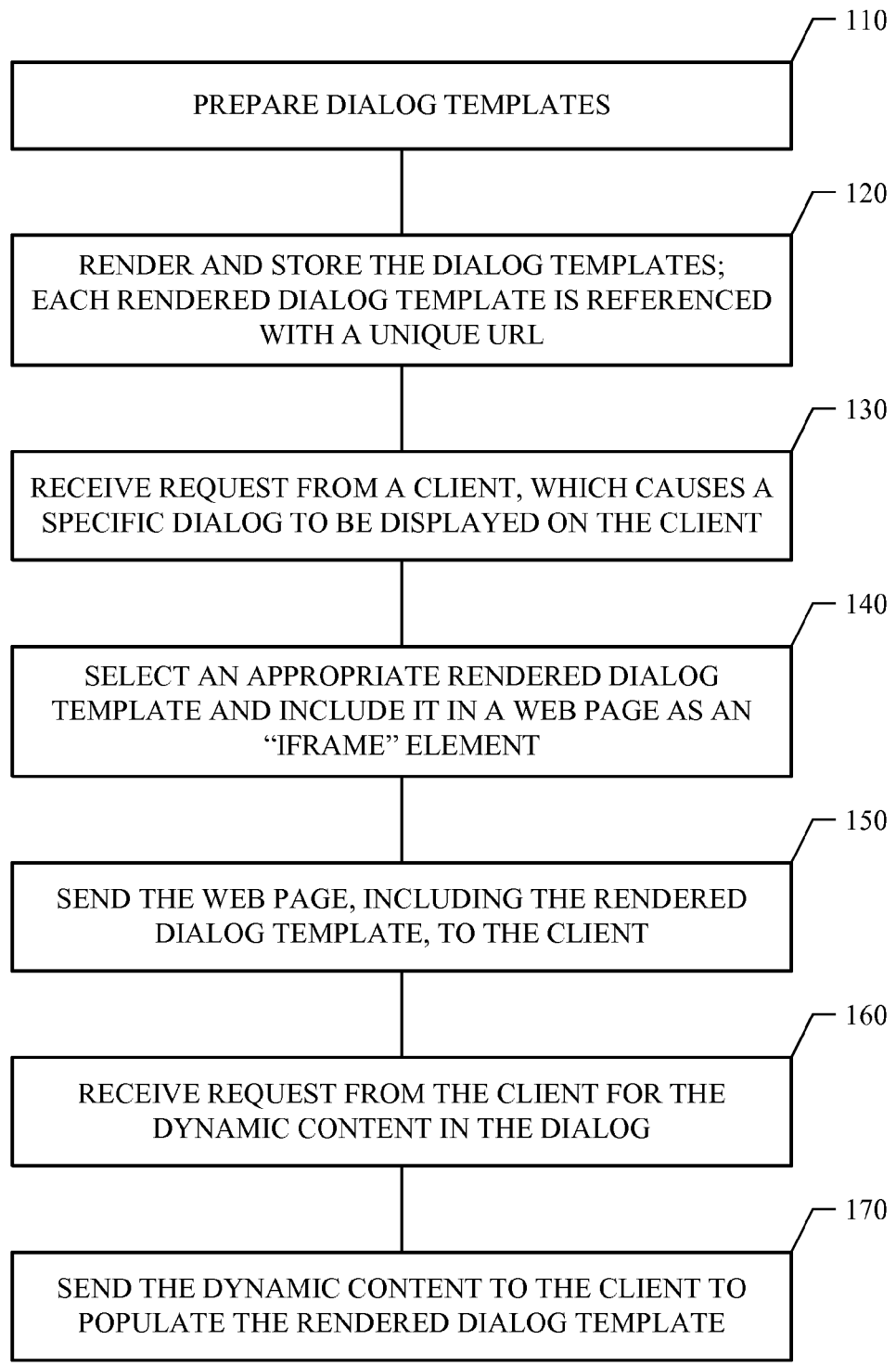
FIG. 1 illustrates an example method for displaying dialogs on electronic devices.

FIG. 1 illustrates an example method for displaying UI dialogs on electronic devices. The electronic devices may be of any type, such as computers (e.g., desktop, notebook, netbook, tablet) and mobile devices (e.g., mobile telephones, tablet computers, game consoles, personal digital assistants). In some implementations, the process illustrated in FIG. 1 is especially beneficial for displaying dialogs on mobile devices, such as mobile telephones, that have limited resources (e.g., in terms of processing power, memory, or network bandwidths). In particular embodiments, the electronic devices are client devices that are connected to servers via a computer or communications network (e.g., a cellular network or the Internet). These client devices communicate with the servers through wired or wireless connections.

In particular embodiments, a number of (e.g., one or more) dialog templates are defined (as illustrated in STEP 110). Each dialog template corresponds to a type of UI dialogs. For example, one dialog template may correspond to a type of dialogs that is suitable for asking a user a question and seeking an answer to the question from the user; and another dialog template may correspond to a different type of dialogs that is suitable for sending a message or notification to a user. Each dialog template may have its own design, layout, look and feel, or rendering code, and this disclosure contemplates any applicable dialog template.

Figure 2:
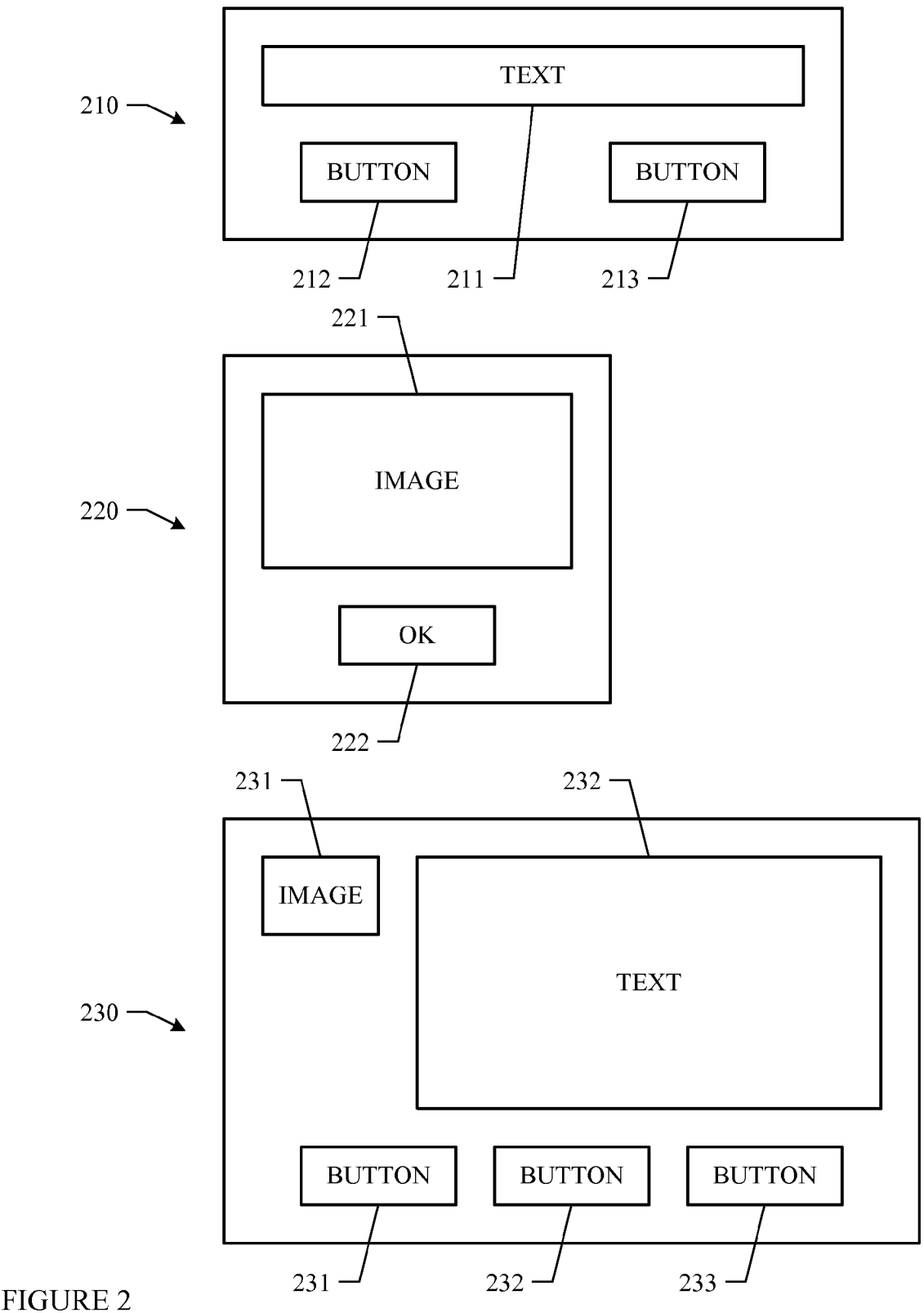
FIG. 2 illustrates three example dialog templates.

FIG. 2 illustrates three example dialog templates 210, 220, 230. Dialog template 210 corresponds to a type of dialogs that includes three elements: a text field 211 and two buttons 212, 213. This type of dialogs may be suitable for asking users a question with a yes/no type answer. The question itself may be presented in text field 211, and the two answer choices may be presented as the two buttons 212 and 213 respectively. For example, the question may be, "Do you want to add John Smith to your contact list?" and the two answers may be "Yes" and "No". Or, the question may be, "Do you want to continue with this software installation?" and the two answers may be "Proceed" and "Cancel". The user may answer the question by clicking on one of the two buttons 212 and 213 that present the two possible answers. As these examples illustrate, different questions may be asked using the same dialog template 210 under different circumstances, and different answers may be provided with different questions. Thus, the actual content of text field 211 and buttons 212 and 213 may change, depending on, for example, when, where, or under what circumstances a specific dialog is displayed, but the three elements in the dialog as well as the layout of these elements and the look and feel of the dialog may remain the same. In other words, although dialog template 210 itself does not change (i.e., the dialog template remains static), the elements in dialog template 210 may incorporate different content at different times (i.e., the static dialog template may incorporate dynamic content).

Of course, it is not necessary that each and every element in a dialog template has dynamic content, and it is possible that a dialog template has no dynamic content at all. For example, dialog template 220 corresponds to a type of dialogs that includes two elements: an image field 221 and an "OK" button 222. In this case, image field 221 may support dynamic content such that different images may be presented in image field 221 when the corresponding dialog is displayed at different times. However, "OK" button 222 may remain static (e.g., the word "OK" on button 222 does not change). Again, dialog template 220 itself remains static because the number (e.g., 2), type (e.g., image field 221 and "OK" button 222), and layout (image filed 221 positioned above "OK" button 222) of its elements, its look and feel, and its rendering code do not change.

A dialog template may include any number of elements and any type of elements (e.g., image, text, icon, button, or check box). These elements may be arranged according to any design layout. Each element may have static or dynamic content. For example, dialog template 230 includes an image field 231 that may be used to present different images (e.g., logos or icons) at different times, a text field 232 that may be used to present different texts at different times, and three buttons 231, 232, 233. As example dialog templates 210, 220, 230 illustrate, a static dialog template may support dynamic content.

In some implementations, when defining a dialog template, the information may specify, for example and without limitation, the number of elements included in the dialog and for each element, its type (e.g., text, image, button, icon), size, position, color, font (e.g., type, size, and color), content type (e.g., static or dynamic), and so on. In addition or alternatively, in some implementations, the dialog template may include rendering code that may be used to render the dialog for display on electronic devices.

In particular embodiments, each dialog template is rendered (as illustrated in STEP 120). In some implementations, a dialog template is rendered using the rendering code included with the dialog template. In some implementations, rendering a dialog template results in a set of HyperText Markup Language (HTML) source code to be generated. The HTML source code represents the rendered dialog template. For example, when the HTML source code is loaded into a web browser, it causes a corresponding dialog to be displayed in the browser. In some implementations, other types of code, such as Extensible HyperText Markup Language (XHTML) or Extensible Markup Language (XML), which can be directly processed by web browsers, may also be used (e.g., together with the HTML code) to represent a rendered dialog template.

In particular embodiments, if a dialog template supports any dynamic content, the code representing the corresponding rendered dialog template may include a number of place holders. Each place holder may correspond to a specific piece of dynamic content. In some implementations, each place holder may be marked by a token included at an appropriate location in the code. For example, if the rendered dialog template is represented as HTML code, the token may be a pre-defined HTML element. At each location in the code where a piece of dynamic content should be, the token is included to indicate that some dynamic content should be displayed here. For example, for dialog template 210 illustrated in FIG. 2, it supports three pieces of dynamic content respectively associated with the three elements (e.g., text field 211 and buttons 212 and 213) included in the dialog. When dialog template 210 is rendered, the code representing the rendered dialog template 210 should include three tokens marking three place holders for the three pieces of dynamic content respectively. More specifically, one token should be placed in connection with text field 211; another token should be placed in connection with button 212; and the third token should be placed in connection with button 213.

In particular embodiments, each rendered dialog template is stored and each stored dialog template is associated with a unique URL, which can be used to identity and reference the stored dialog template (as illustrated in STEP 120). In some implementations, to store a rendered dialog template causes the set of code (e.g., HTML code) representing that rendered dialog template to be stored. The code may be stored at a location that is accessible via a network. The URL references the location where the code representing the rendered dialog template is stored, and thus can be used to access the stored code.

In particular embodiments, the rendered dialog templates may be incorporated into and used with a web-based software application. In some implementations, the software may host a social-networking website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. The rendered dialog templates may be used by the social-networking website to communicate with its users.

In particular embodiments, when a dialog needs to be displayed on a client device (e.g., in response to a user input), client-side code (e.g., a function associated with the user-interface component with which the user has interacted) may select an appropriate dialog template corresponding to the dialog to be displayed. For example, a user-interface component (e.g., a button) may be associated with a client-side function written in JavaScript. When a user interacts with this user-interface component (e.g., clicks on the button), the associated client-side function is invoked. The function selects an appropriate dialog template to be rendered and displayed on the client device. This helps minimize the need for the client to perform server requests as such operations are relatively slow.

Alternatively, in other embodiments, a client device (e.g., a mobile electronic device) associated with a user of a website (e.g., the social-networking website) may send a request to a server hosting the website (as illustrated in STEP 130). When the server responds to this request, it may cause a specific dialog to be displayed on the client device. The server may select a dialog template based on the type of the specific dialog to be displayed (as illustrated in STEP 140). As described above, each dialog template may correspond to a different type of UI dialogs. Depending on the type of dialogs to which the specific dialog belongs, the corresponding dialog template may be selected.

The selected dialog template has already been rendered and the corresponding rendered dialog template has been stored, as described above. In particular embodiments, the server may construct a web page and includes the corresponding rendered dialog template in that web page (as illustrated in STEP 140). In some implementations, the rendered dialog template may be referenced in the web page by its URL, which indicates where the rendered dialog template (e.g., its code) is stored and how it can be accessed. In other words, the HTML, XHTML, or XML source code representing the web page may include the URL referencing the rendered dialog template at an appropriate location. In some implementations, the rendered dialog template may be included in the web page as an "iframe" element, as marked by the <iframe> tag. The server may then send the code representing the web page, which includes the rendered dialog template, to the client device (as illustrated in STEP 150). Alternatively, if the rendered dialog template has already been cached on the client device (as described in more detail below), the cached version of the dialog template may be used directly, without the need for the client to request it from the server.

In particular embodiments, upon receiving the code representing the web page, the client device may load the code into a web browser. The web browser may, in some cases with the help of appropriate client-side scripts, process and interpret the code in order to display the web page. When the web browser encounters the URL referencing the rendered dialog template, it may retrieve the code representing the rendered dialog template using the URL and display the corresponding dialog, as specified by the code, as a part of the web page (e.g., as an "iframe" element within the web page).

If the rendered dialog template supports any dynamic content, the code representing the rendered dialog template should include a number of place holders, marked by predefined tokens, as described above. In some implementations, when processing the code representing the rendered dialog template, the web browser may invoke a client-side script to parse the code and look for these tokens. For example, the script may be implemented using JavaScript. In particular embodiments, if any token is found in the code, it suggests that this dialog template supports dynamic content. If no token is found in the code, it suggests that the dialog template supports no dynamic content. In particular embodiments, if the dialog template supports dynamic content, the client-side script passes the needed dynamic content to the dialog iframe. For example, if the dialog needs to display the current user's name, then the value of the name is passed.

In particular embodiments, the server, upon receiving requests from the client device for the dynamic content to be included in the dialog, may determine the appropriate dynamic content to be sent to this client device at this time (as illustrated in STEP 160). Alternatively, in other embodiments, the client-side code (e.g., the JavaScript function associated with the user-interface component, which has been invoked when the user interacts with the user-interface component, and which has selected the dialog template) may pass the dynamic content to the dialog. In this case, the dynamic content to be displayed comes from the client-side code, not the server. Which specific pieces of dynamic content should be selected may depend on, for example and without limitation, the type of dialog being displayed, the party sponsoring the dialog, the software application incorporating the dialog, the identity of the user, the type of the client device, the current status of the software application, or the information to be communicated to the user. For example, dialog template 230 may be used to communicate a message from a software application to the user. In this case, image field 231 may be used to display a logo of the software application. Depending on which specific software application is currently running, the logo of that specific software application may be selected and sent to the client device to be displayed in image field 231.

The server may send the appropriate dynamic content to the client device (as illustrated in STEP 170). In particular embodiments, upon receiving all the dynamic content needed for the dialog, the client device (e.g., through the web browser or the client-side script) may search through the HTML or JavaScript markup representing the rendered dialog template for tokens that mark the place holders for the dynamic content and replace each token found with a corresponding piece of dynamic content (e.g., the actual value that should be included in the dialog). Each piece of dynamic content is displayed in place of its corresponding token. Thus, when the dialog is displayed in the web page, the dynamic content included in the actual dialog is also displayed at the appropriate locations. For example, when a dialog derived from dialog template 230 is displayed in a web page, a logo of the software application received from the server is displayed in image field 231.

As described above, in particular embodiments, the server may be associated with a social-networking system. The system may utilize a number of servers (e.g., for hosting a social-networking website). In some implementations, these servers may be arranged in a tiered structure. The servers at one tier may support some functionalities of the system, while the servers at another tier may implement other functionalities of the system. For example, at one tier, there may be a number of servers managing and supporting the services provided by the system (e.g., user information, social connections, user actions, etc.). At another tier, there may be a number of servers (e.g., sometimes referred to as "edge" servers) directly receiving requests from client devices associated with the users and responding to these requests.

In some implementations, the dialog templates may be managed by some servers, which may be responsible for defining and rendering the dialog templates, storing the rendered dialog templates, and associating URLs with the stored dialog templates. Other servers (e.g., "edge" or "content delivery network" (CDN) server), such as those directly receiving requests from client devices and responding to these requests, may cache some or all of the rendered dialog templates. In addition, individual client devices may also cache some or all of the rendered dialog templates. Given a specific dialog template, while this dialog template remains unchanged, its corresponding rendered dialog template remains unchanged. Similarly, the URL associated with the rendered dialog template remains unchanged. Thus, the cached version of this rendered dialog template is not invalidated. However, if there is any need to update this dialog template by making changes to it, its corresponding rendered dialog template will change as well, which means the URL associated with the rendered dialog template will change. This will invalidate the old cached copies of the rendered dialog template.

In some implementations, there may be servers physically located in different parts of the world. Each server may mainly serve clients located in the same region. For example, a server physically located in Paris may mainly serve clients from western Europe, while a server physically located in Beijing may mainly serve clients from northern China. Such a server may cache some or all of the rendered dialog templates. When a dialog needs to be displayed on a client device, the local server (e.g., a server located in the same region as the client device) may send the cached version of the corresponding rendered dialog template (e.g., included in a web page) to the client. This reduces the time it takes to send the dialog to the client and thus reduces latency.

In some implementations, some or all of the rendered dialog templates may be cached on individual clients. When a dialog needs to be displayed on a client device (e.g., as included in a web page), if the corresponding rendered dialog template has already been cached on this client device, that cached version of the rendered dialog template may be served directly, without the client having to make a server request for the rendered dialog template. In this case, although the web page that includes the dialog may be sent to the client device from an appropriate server, the dialog itself is not. Instead, the corresponding rendered dialog template cached on the client device is served. In some implementations, caching rendered dialog templates on client devices enable the client devices to pre-load these dialog templates (e.g., before the dialogs are actually needed), since the dialog templates are static. This further increases the chance of content being cached and allows the time for parsing and loading of the HTML code to be effectively "hidden" from end users.

In particular embodiments, a third party (e.g., a partner of the social-networking system) may incorporate dialogs defined and provided by the social-networking system in its own web pages served by the third party. The social-networking system may define a set of dialog templates, render these templates, and store them at a location accessible to the third party. Each dialog template may be referenced with a unique URL. Subsequently, the third party may incorporate any of such dialog templates in its own web pages by referencing them using their respective URLs.

Alternatively, in other embodiments, a third party (e.g., a partner of the social-networking system) may incorporate its own dialogs into web pages served by the social-networking website to its users. By agreement with the social-networking system, the third party may provide its own dialog templates to the social-networking system. These dialog templates may be rendered and stored with the social-networking system, and URLs may be associated with the stored dialog templates. When needed, the servers hosting the social-networking website may include URLs associated with these third-party dialog templates in the web pages constructed and sent to the client devices of the users of the social-networking website.

Figure 3:
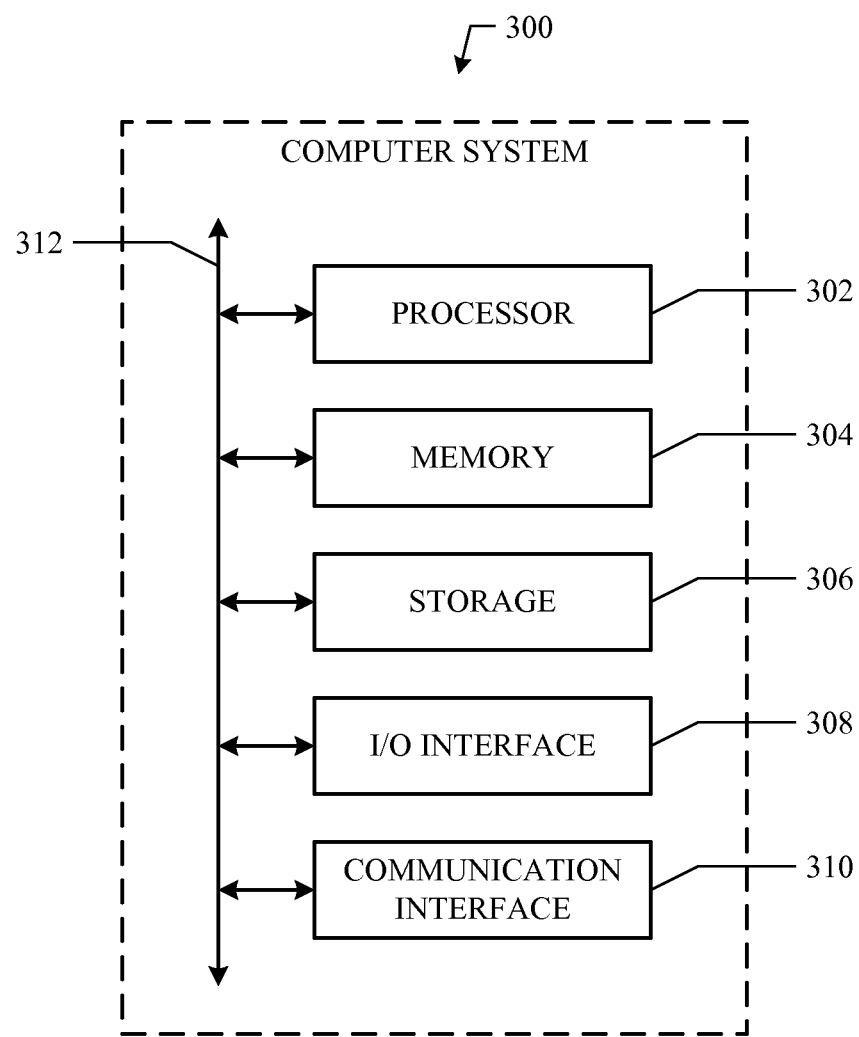
FIG. 3 illustrates an example computer system.

Particular embodiments may be implemented on one or more computer systems. FIG. 3 illustrates an example computer system 300, which may implement a server. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices,
    rendering and storing a plurality of dialog templates, each dialog template comprising content for presenting a dialog requiring user interaction and one or more place holders for insertion of content, each dialog template stored with a unique identifier,
    receiving, from client-side code associated with a user-interface component of an electronic device, a request, which causes a dialog to be displayed on the electronic device;
    selecting, from the plurality of dialog templates, a rendered dialog template corresponding to the dialog, the rendered dialog template having been rendered for display on electronic devices;
    constructing a web page that includes the rendered dialog template comprising the one or more placeholders; and
    sending, to the electronic device, the web page including the rendered dialog template comprising the one or more placeholders for insertion and display of the content by the client-side code executed on the requesting electronic device.

2. The method of claim 1, wherein the rendered dialog template is included in the web page as an "iframe" element.

3. The method of claim 1, wherein the rendered dialog template is referenced with a Uniform Resource Locator (URL).

4. The method of claim 1, wherein:
    each place holder is identified by a token and corresponds to a piece of dynamic content.

5. The method of claim 1, further comprising:
    defining one or more dialog templates respectively corresponding to one or more types of dialogs;
    rendering the one or more dialog templates for display on the electronic devices;
    storing the one or more rendered dialog templates; and
    associating each rendered dialog template with a unique Uniform Resource Locator (URL) for identifying and referencing the rendered dialog template.

6. The method of claim 5, wherein each rendered dialog template is represented using HyperText Markup Language (HTML) code.

7. The method of claim 5, wherein:
    at least one of the one or more dialog templates each comprises one or more pieces of dynamic content; and
    for each dialog template that comprises one or more pieces of dynamic content, when rendering the dialog template, each piece of dynamic content included in the dialog template has a corresponding place holder, identified by a token, in the rendered dialog template.

8. The method of claim 5, wherein selecting the rendered dialog template corresponding to the dialog:
    determining a type of dialogs to which the dialog belongs; and
    selecting, from the one or more rendered dialog templates, the specific rendered dialog template corresponding to the type of dialogs to which the dialog belongs.

9. A method comprising:
    sending, to a computing device and by client-side code associated with a user-interface component of an electronic device, a request, which causes a dialog to be displayed on the electronic device;
    receiving, from the computing device, a web page that includes a rendered dialog template corresponding to the dialog, the rendered dialog template comprising one or more place holders for insertion of content;
    inserting, by the client-side code, content in the place of the one or more place holders; and
    displaying, by the client-side code associated with the user-interface component of the electronic device, the web page including the dialog, the dialog being displayed based on the rendered dialog template.

10. The method of claim 9, further comprising selecting the rendered dialog template corresponding to the dialog.

11. The method of claim 9, wherein the rendered dialog template is included in an "iframe" element in the web page.

12. The method of claim 9, wherein:
    the rendered dialog template is referenced with a Uniform Resource Locator (URL); and
    rendered dialog template is represented using HyperText Markup Language (HTML) code.

13. The method of claim 9, wherein the one or more place holders respectively correspond to one or more pieces of dynamic content.

14. The method of claim 13, further comprising:
processing the rendered dialog template included in the web page to identify the one or more place holders; and
for each place holder, selecting a piece of dynamic content to be displayed in the dialog replacing the place holder.

15. The method of claim 14, wherein the client-side code comprises a client-side script, written in JavaScript, residing on the electronic device.

16. The method of claim 14, wherein displaying the web page comprises:
for each place holder included in the rendered dialog template, replacing the place holder with the corresponding piece of dynamic content and displaying the corresponding piece of dynamic content in place of the place holder.

17. The method of claim 9, further comprising caching the rendered dialog template.

18. The method of claim 9, wherein the electronic device is a mobile device.

19. A system comprising:
a memory comprising instructions executable by one or more processors; and
the one or more processors coupled to the memory and operable to execute the instructions, the one or more processors being operable when executing the instructions to:
render and store a plurality of dialog templates, each dialog template comprising content for presenting a dialog requiring user interaction and one or more place holders for insertion of content, each dialog template stored with a unique identifier,
receive, from client-side code associated with a user-interface component of an electronic device, a request, which causes a dialog to be displayed on the electronic device;
select, from the plurality of dialog templates, a rendered dialog template corresponding to the dialog, the rendered dialog template having been rendered for display on electronic devices;
construct a web page that includes the rendered dialog template comprising the one or more placeholders; and
send, to the electronic device, the web page including the rendered dialog template comprising the one or more placeholders for insertion and display of the content by the client-side code executed on the requesting electronic device.

20. The system of claim 19, wherein the one or more processors are further operable when executing the instructions to:
define one or more dialog templates respectively corresponding to one or more types of dialogs;
render the one or more dialog templates for display on the electronic devices;
store the one or more rendered dialog templates; and
associate each rendered dialog template with a unique Uniform Resource Locator (URL) for identifying and referencing the rendered dialog template.

* * * * *